United States Patent
Ament

[11] Patent Number: 5,590,847
[45] Date of Patent: Jan. 7, 1997

[54] FLY REEL WITH ADJUSTABLE BRAKE ASSEMBLY

[76] Inventor: Weston H. Ament, P.O. Box 194, Mokelumne Hill, Calif. 95245

[21] Appl. No.: 518,683

[22] Filed: Aug. 24, 1995

[51] Int. Cl.⁶ .................................................. A01K 89/015
[52] U.S. Cl. .......................................................... 242/317
[58] Field of Search .................................... 242/295, 303, 242/318, 317

[56] References Cited

U.S. PATENT DOCUMENTS

| | | | |
|---|---|---|---|
| 2,656,993 | 10/1953 | Dukes | 242/317 X |
| 3,806,060 | 4/1974 | Valentine | 242/295 X |
| 4,168,041 | 9/1979 | Moosberg | 242/295 |
| 4,515,325 | 5/1985 | Ito | 242/295 |
| 4,685,632 | 8/1987 | Yeh . | |
| 4,702,432 | 10/1987 | Kaneko et al. . | |
| 4,703,902 | 11/1987 | Prouza et al. | 242/303 |
| 4,750,687 | 6/1988 | Sievert et al. | 242/295 |
| 4,881,698 | 11/1989 | Doiron . | |
| 5,273,235 | 12/1993 | Sato . | |
| 5,301,899 | 4/1994 | Sato . | |
| 5,318,245 | 6/1994 | Sato et al. . | |
| 5,407,144 | 4/1995 | Ryall | 242/295 |

Primary Examiner—Daniel P. Stodola
Assistant Examiner—Emmanuel M. Marcelo

[57] ABSTRACT

A fly reel for storing and adjustably dispensing fishing line. The inventive device includes a main housing having a center hub projecting therefrom. A spool is rotatably mounted over the center hub and operates to receive and dispense a fishing line thereon. A brake assembly is mechanically coupled to the spool to allow the spool to rotate freely in a first direction, and to adjustably retard rotation of the spool in a second direction. The brake assembly includes a cylindrical bearing interposed between the spool and the center hub. A ratchet plate is mounted to the cylindrical bearing and is engaged by a pawl mounted to the spool when the spool is rotated in the second direction. A center axle extends through the cylindrical bearing and can be axially biased against the cylindrical bearing to cause a frictional engagement of the ratchet plate with an interior of the main body, thereby retarding rotation of the spool in the second direction.

14 Claims, 4 Drawing Sheets

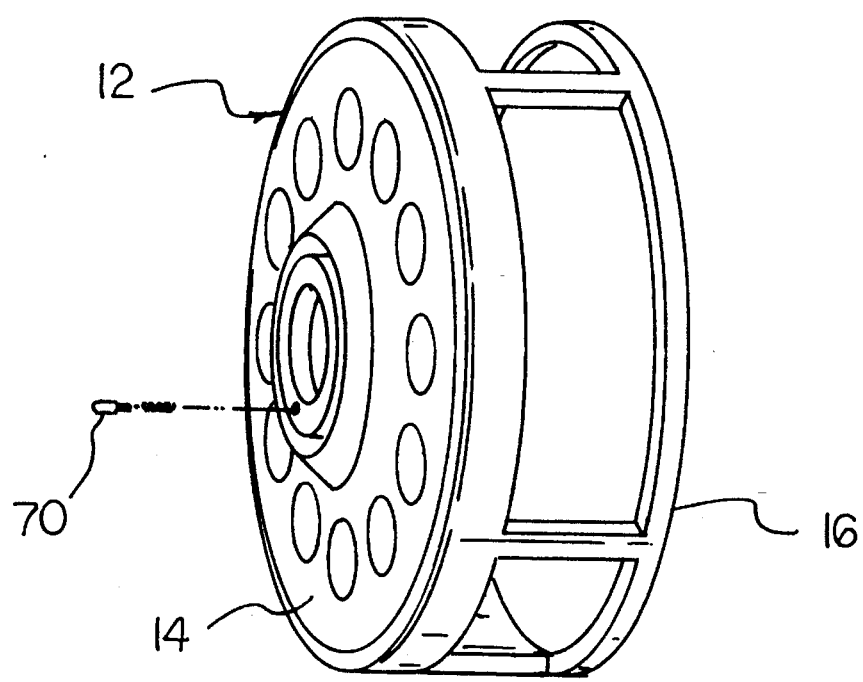
FIG 5
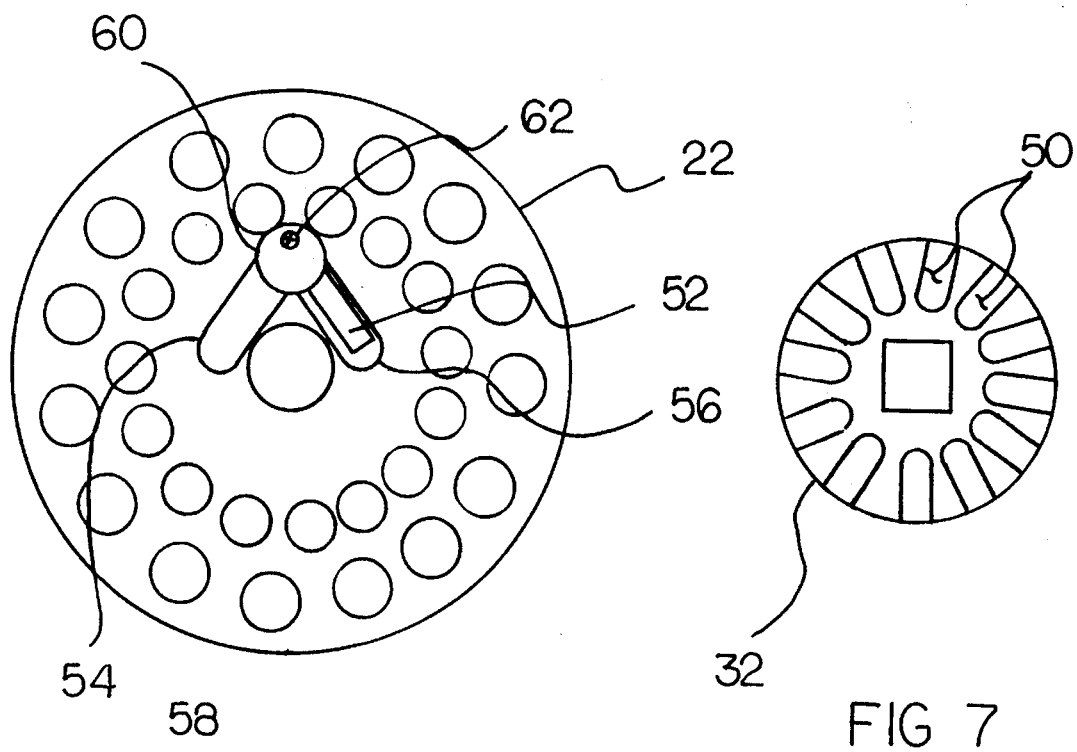
FIG 6
FIG 7

FLY REEL WITH ADJUSTABLE BRAKE ASSEMBLY

BACKGROUND OF THE INVENTION

1. Field of the Invention

The present invention relates to fishing reel structures and more particularly pertains to a fly reel for storing and adjustably dispensing fishing line.

2. Description of the Prior Art

The use of fishing reel structures is known in the prior art. More specifically, fishing reel structures heretofore devised and utilized are known to consist basically of familiar, expected and obvious structural configurations, notwithstanding the myriad of designs encompassed by the crowded prior art which have been developed for the fulfillment of countless objectives and requirements.

For example, U.S. Pat. No. 4,685,632 to inventor Yeh discloses a fly-fishing reel having a clicker type brake which utilizes adjustable spring force applied to a pawl of a ratchet to regulate a resistive force against rotation of the reel.

The U.S. Pat. No. 5,318,245 to Sato discloses a brake for a fishing reel which utilizes centrifugal forces to regulate the amount of braking applied to the reel.

Another patent of interest is U.S. Pat. No. 4,702,432 to Kaneko which teaches a spinning reel brake in which a drag adjusting knob produces an increased engaging force to a plurality of axially aligned friction plates.

Other known prior art fishing reel structures include U.S. Pat. Nos. 3,107,876; 3,185,406; 5,318,245; 4,881,698; 5,301,899; and 5,273,235.

While these devices fulfill their respective, particular objectives and requirements, the aforementioned patents do not disclose a fly reel for storing and adjustably dispensing fishing line which includes main housing having a center hub projecting therefrom, a spool rotatably mounted over the center hub for receiving and dispensing a fishing line, and a brake assembly mechanically coupled to the spool to allow the spool to rotate freely in a first direction, and to adjustably retard rotation of the spool in a second direction. Further, the prior art does not teach a fly reel of the aforementioned structure wherein the brake assembly includes a cylindrical bearing interposed between the spool and the center hub, a ratchet plate mounted to the cylindrical bearing and engaged by a pawl mounted to the spool when the spool is rotated in the second direction, and a center axle extending through the cylindrical bearing which can be axially biased against the cylindrical bearing to cause a frictional engagement of the ratchet plate with an interior of the main body, thereby retarding rotation of the spool in the second direction.

In these respects, the fly reel according to the present invention substantially departs from the conventional concepts and designs of the prior art, and in so doing provides an apparatus primarily developed for the purpose of storing and adjustably dispensing fishing line.

SUMMARY OF THE INVENTION

In view of the foregoing disadvantages inherent in the known types of fishing reel structures now present in the prior art, the present invention provides a new fly reel construction wherein the same can be utilized for storing and adjustably dispensing fishing line. As such, the general purpose of the present invention, which will be described subsequently in greater detail, is to provide a new fly reel apparatus and method which has many of the advantages of the fishing reel structures mentioned heretofore and many novel features that result in a fly reel which is not anticipated, rendered obvious, suggested, or even implied by any of the prior art fishing reel structures, either alone or in any combination thereof.

To attain this, the present invention generally comprises a fly reel for storing and adjustably dispensing fishing line. The inventive device includes a main housing having a center hub projecting therefrom. A spool is rotatably mounted over the center hub and operates to receive and dispense a fishing line thereon. A brake assembly is mechanically coupled to the spool to allow the spool to rotate freely in a first direction, and to adjustably retard rotation of the spool in a second direction. The brake assembly includes a cylindrical bearing interposed between the spool and the center hub. A ratchet plate is mounted to the cylindrical bearing and is engaged by a pawl mounted to the spool when the spool is rotated in the second direction. A center axle extends through the cylindrical bearing and can be axially biased against the cylindrical bearing to cause a frictional engagement of the ratchet plate with an interior of the main body, thereby retarding rotation of the spool in the second direction.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fly reel apparatus and method which has many of the advantages of the fishing reel structures mentioned heretofore and many novel features that result in a fly reel which is not anticipated, rendered obvious, suggested, or even implied by any of the prior art fishing reel structures, either alone or in any combination thereof.

It is another object of the present invention to provide a new fly reel which may be easily and efficiently manufactured and marketed.

It is a further object of the present invention to provide a new fly reel which is of a durable and reliable construction.

An even further object of the present invention is to provide a new fly reel which is susceptible of a low cost of manufacture with regard to both materials and labor, and which accordingly is then susceptible of low prices of sale to the consuming public, thereby making such fly reels economically available to the buying public.

Still yet another object of the present invention is to provide a new fly reel which provides in the apparatuses and methods of the prior art some of the advantages thereof, while simultaneously overcoming some of the disadvantages normally associated therewith.

Still another object of the present invention is to provide a new fly reel for storing and adjustably dispensing fishing line.

Yet another object of the present invention is to provide a new fly reel which includes main housing having a center hub projecting therefrom, a spool rotatably mounted over the center hub for receiving and dispensing a fishing line, and a brake assembly mechanically coupled to the spool to allow the spool to rotate freely in a first direction, and to adjustably retard rotation of the spool in a second direction.

Even still another object of the present invention is to provide a new fly reel of the aforementioned structure wherein the brake assembly includes a cylindrical bearing interposed between the spool and the center hub, a ratchet plate mounted to the cylindrical bearing and engaged by a pawl mounted to the spool when the spool is rotated in the second direction, and a center axle extending through the cylindrical bearing which can be axially biased against the cylindrical bearing to cause a frictional engagement of the ratchet plate with an interior of the main body, thereby retarding rotation of the spool in the second direction.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a rear isometric illustration of a main housing of the invention.

FIG. 6 is a rear elevational view of a spool of the invention illustrating an adjustable positioning of a pawl.

FIG. 7 is a front elevational view of a ratchet plate of the fly reel.

DESCRIPTION OF THE PREFERRED EMBODIMENT

Figure 1:
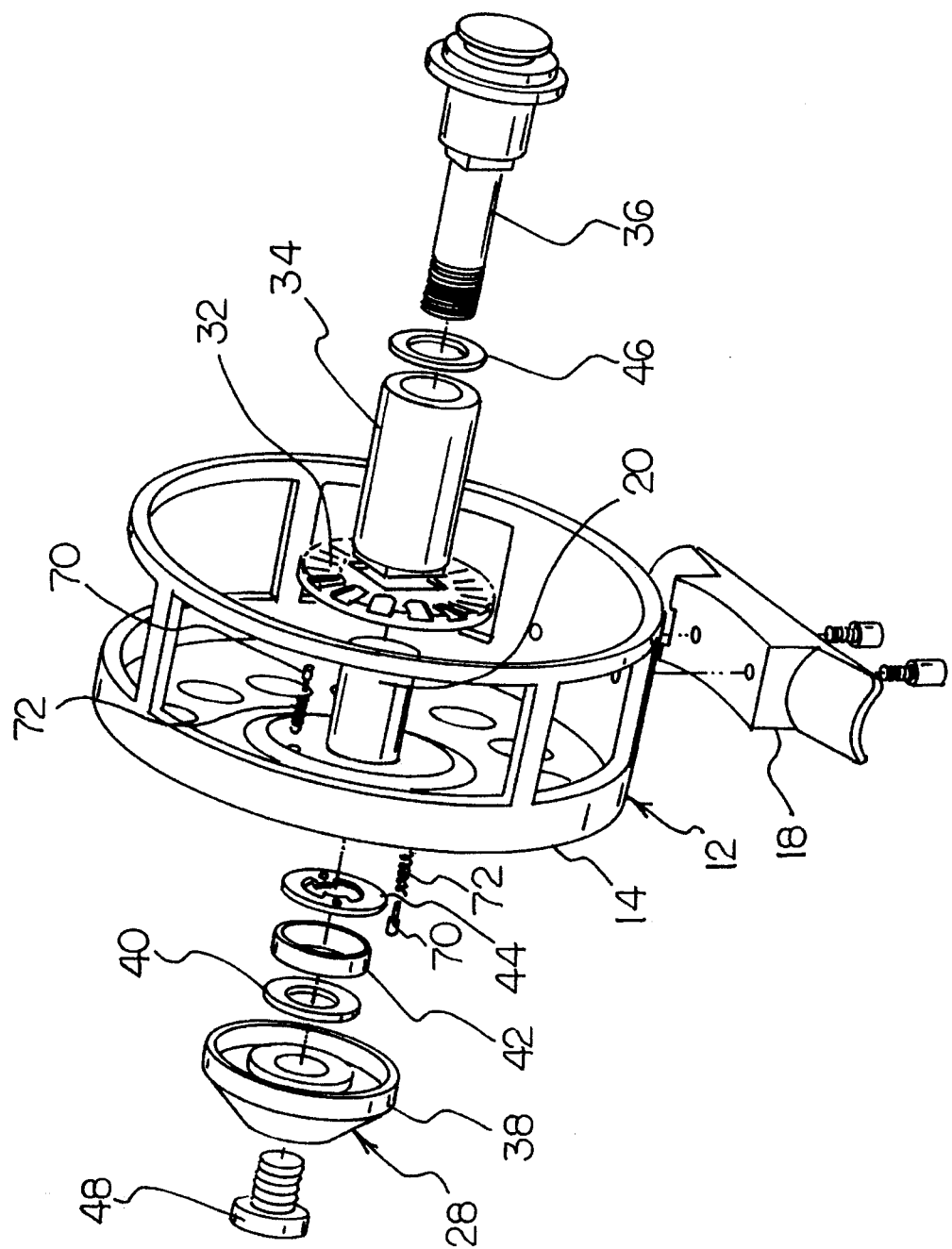
FIG. 1 is an exploded isometric illustration of a first portion of a fly reel according to the present invention.

With reference now to the drawings, and in particular to FIGS. 1–7 thereof, a new fly reel embodying the principles and concepts of the present invention and generally designated by the reference numeral 10 will be described.

Figure 2:
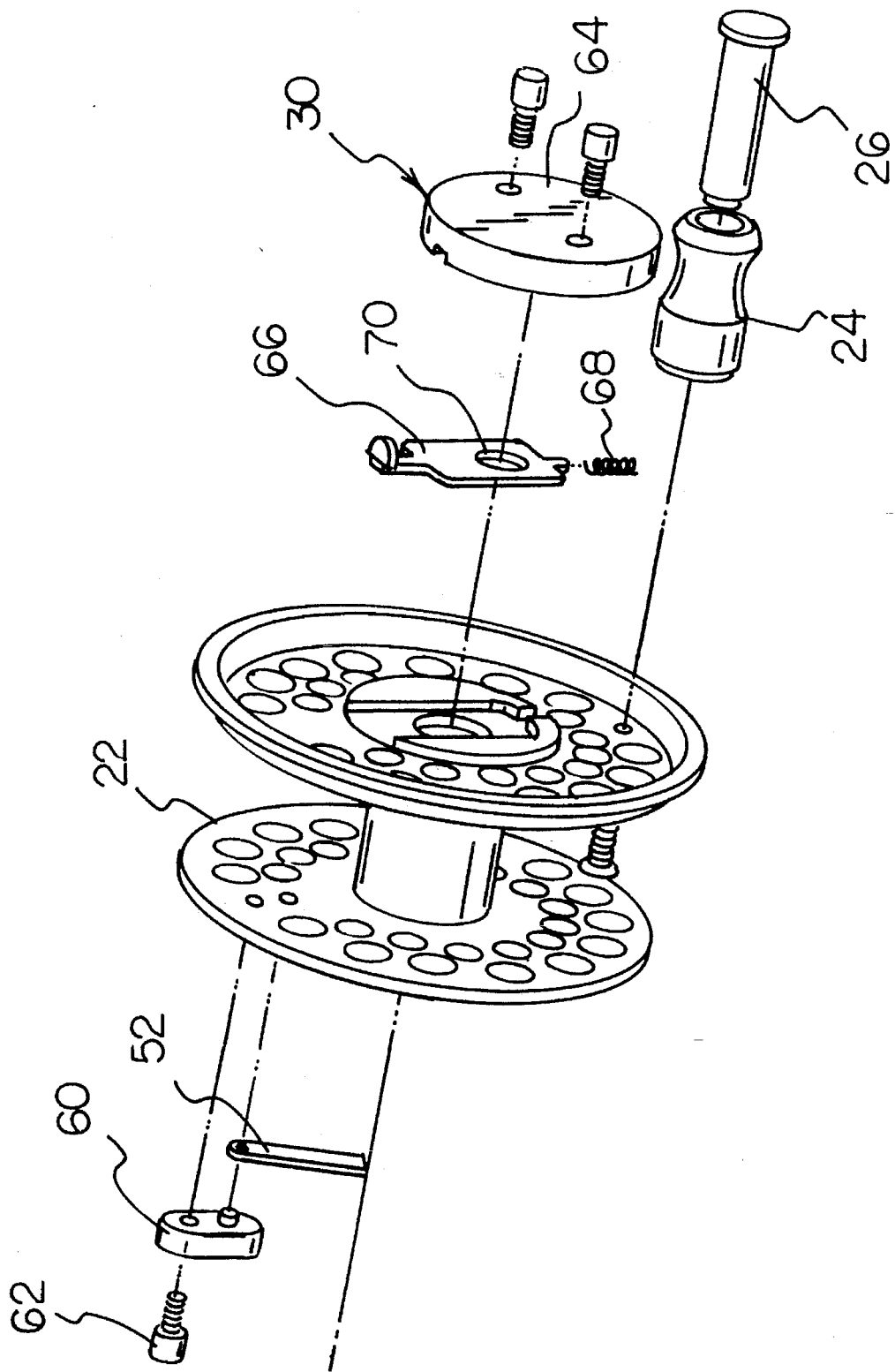
FIG. 2 is an exploded isometric illustration of a second portion of the fly reel.

More specifically, it will be noted that the fly reel 10 comprises a main housing 12 having a rear plate 14 and a reel cage 16 projecting from the rear plate. A rod mounting member 18 can be secured to the main housing by a plurality of unlabeled fasteners to permit mounting of the main housing to a fly or other fishing rod. A center hub 20 projects from a center interior surface of the rear plate 14 of the main housing 12 and is concentrically positioned within the reel cage 16, substantially as illustrated in FIG. 1 of the drawings. As shown in FIG. 2, a spool 22 is rotatably mounted about the center hub 20 and operates to receive and/or dispense fishing line wound thereabout. A handle tube 24 is rotatably mounted in an offset or eccentric position to the spool 22 and is supported by a handle axle 26 directed through the handle tube and coupled to an outer exterior surface of the spool to permit manual rotation of the spool relative to the main housing 12. A brake means 28 is interposed between the spool 22 and the main housing 12 for effecting adjustable retarding of a rotational motion of the spool 22 relative to the main housing 12 such that fishing line can be dispensed therefrom only when a desired tension is applied. A locking assembly 30 can be provided with the invention 10 for removably and rotatably coupling the spool 22 relative to the main housing 12 over the center hub 20. By this structure, a fisherman is afforded free reeling of fishing line onto the reel, and can adjust the level of tension needed to effect dispensing of the line from the reel.

Figure 3:
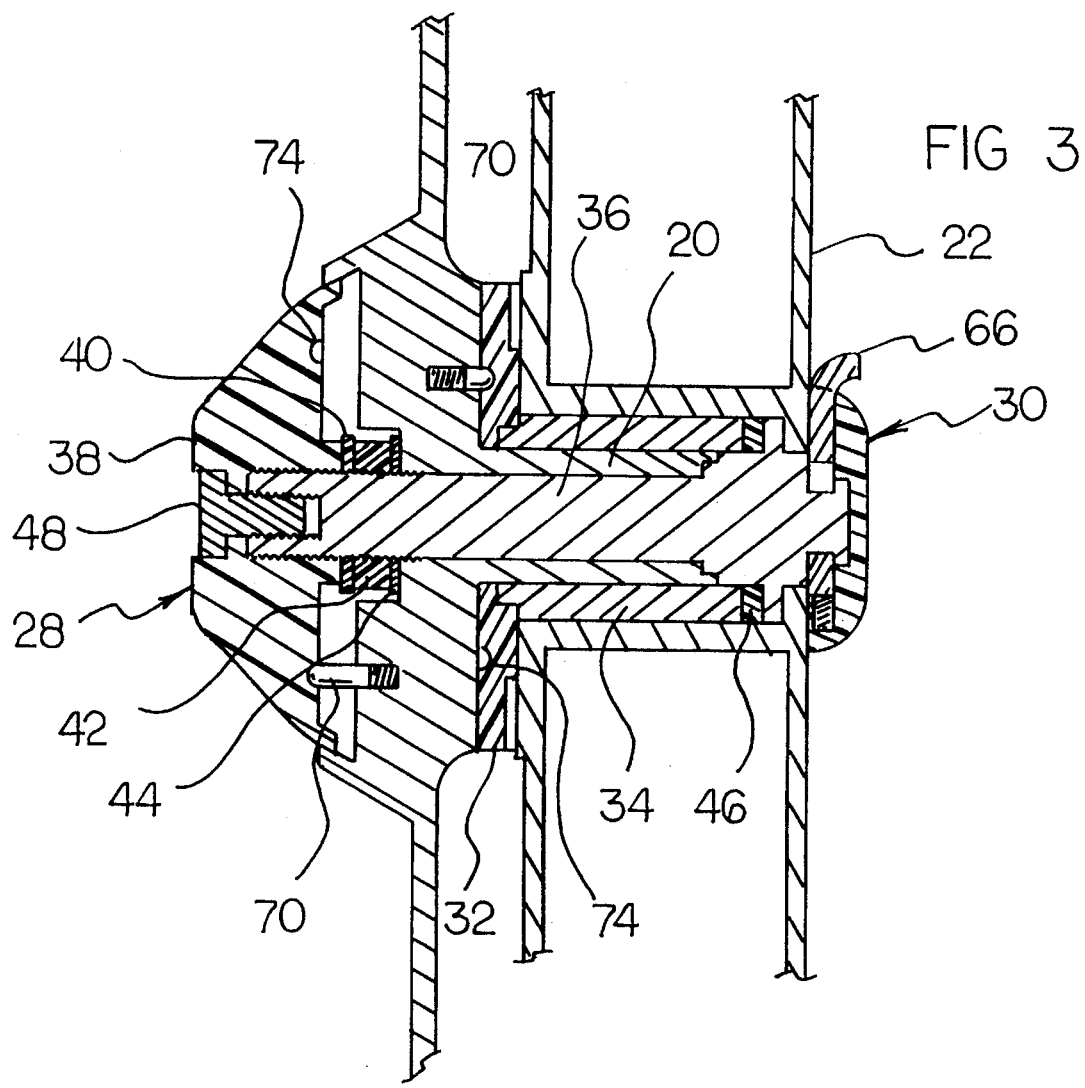
FIG. 3 is a cross sectional view of the assembled invention.

As best illustrated in FIGS. 1 and 3 of the drawings, it can be shown that the brake means 28 of the present invention 10 preferably comprises a brake plate 32 which is rotatably positioned about the center hub 20 of the main housing 12 so as to abuttingly engage an interior surface of the rear plate 14 thereof. A cylindrical bearing 34 is concentrically positioned and rotatably mounted about the center hub 20 and can, but does not necessarily need to be coupled to the brake plate 32 so as to rotate therewith by an unlabeled polygonal projection extending from the cylindrical bearing 34 which is received within an unlabeled polygonal recess formed in the brake plate 32. A center axle 36 projects through a center of the center hub 20 and can, but does not necessarily need to be coupled to the center hub so as to be rotationally fixed relative thereto by an unlabeled polygonal projection extending from the center axle which is received within an unlabeled polygonal recess formed in the center hub. The center axle 36 is shaped so as to define an enlarged interior head at a first end thereof, and exterior threads extending about a second end thereof. The second end of the center axle 36 projects exteriorly of the rear plate 14 of the main housing 12 and is threadably engaged with an adjustment knob 38. The spool 22 is coupled to the brake plate 32 so as to rotate therewith in at least one direction. By this structure, a tightening of the adjustment knob 38 will axially bias the brake plate 32 against the interior surface of the rear plate 14 of the main housing 12 to create a frictional resistance against relative rotation of the brake plate 32 and the rear plate 14 so as to frictionally retard rotation of the spool relative to the main housing 12.

To provide for increased smoothness in operation and adjustment of the brake means 28, the same preferably further comprises a first friction washer 40 formed of a polytetrafluoroethylene material such as is commonly sold under the trademark "TEFLON" which is positioned against an interior surface of the adjustment knob 38. A tension washer 42 formed of a resiliently deformable material such as rubber or neoprene abuts the first friction washer 40 and can be compressed during rotation of the adjustment know to provide increasing axial force on the center axle 36 which is subsequently applied to the brake plate 32 against the interior surface of the rear plate 14 of the housing 12. A retainer 44 can be removably engaged to the exterior threads of the second end of the center axle to maintain assemblage of the brake means, but the retainer 44 is not important to the operation of the brake means except in this capacity. A second friction washer 46 is interposed between the enlarged interior head of the center axle and an axial end of the cylindrical bearing 34. Preferably, the second friction washer 46 is also formed of a polytetrafluoroethylene or "TEFLON" material as the first friction washer 40. A locking fastener 48 is preferably threaded into an interior bore directed into the second end of the center axle 36 so as to limit loosening of the adjustment knob 38 to preclude unintentional separation of the adjustment knob from the center axle. By this configuration of structure, the adjustment knob can be rotatably adjusted to apply a desired axial tension to the center axle which biases the brake plate 34 against the interior surface of the rear plate 14 of the housing 12 to retard rotation of the spool 22.

Figure 4:
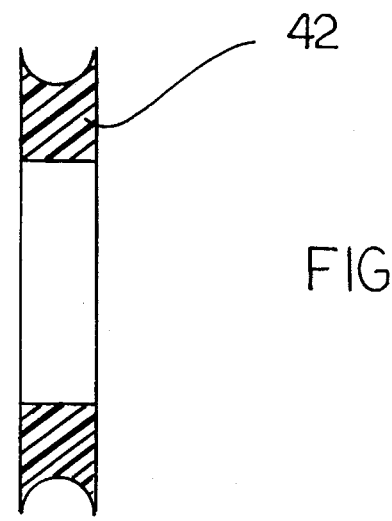
FIG. 4 is a cross sectional view of an alternative form of a tension washer of the invention.

The materials utilized in the construction of the brake means 28 contribute to smooth and consistent operation of the reel 10 and allow for micro-adjustments of the braking force to be made by a fisherman. In this respect, the main housing 12, including the rear plate 14 thereof, is preferably formed of a hardened aluminum material for lightweight and durability. The brake plate 32 is preferably formed of a polymeric material known as "Delrin" so as to provide a desired coefficient of friction between the brake plate 32 and the rear plate 14 of the housing 12. The cylindrical bearing 34 can be formed of bronze and may also be impregnated with a lubricant to provide for inherent lubrication between the spool 22 and the cylindrical bearing as the device 10 is utilized. As shown in FIG. 4, the tension washer 42 is preferably formed of a rubber or neoprene material having the cross-sectional shape illustrated therein to provide a desired increase in axial tension in response to an axial compression of the tension washer 42. In other words, it has been found that the specific cross section shape provides a tension-force-to-compression-ratio which approaches a linear ratio.

While it is to be noted that other known materials or component shapes can be utilized in the construction of any of the components of the present invention 10, the specific combination of different materials employed in certain components, namely the TEFLON friction washers 40, 46; the rubber or neoprene tension washer 42; the bronze bearing 34; the Delrin brake plate 32, and the hardened aluminum rear plate 14 of main housing 12; results in the application of a desired smooth and constant application of friction at any selected brake adjustment setting and therefore constitutes an important feature of the present invention.

To effect coupling of the spool 22 to the brake plate 32 so as to rotate therewith in at least one direction, a ratchet assembly is interposed between the spool and the brake means 28. As shown in FIGS. 2, 6, and 7, the brake plate 32 is preferably formed so as to define a plurality of ratchet recesses directed thereinto and each characterized as having spaced and parallel side walls engaging edges. A ratchet pawl 52 is mounted to the spool 22, as shown in FIG. 6, so as to engage one of the ratchet recesses 50 of the brake plate 32 during rotation of the spool. Preferably, the spool 22 is shaped so as to define a first pawl recess 54 and a second pawl recess 56 extending on opposed sides of a center aperture 58 of the spool, with the ratchet pawl being selectively positionable into either of the pawl recess so as to engage the ratchet recesses 50 of the brake plate 32 when the spool is rotated in a desired direction. The pawl 50 is secured to the spool 22 by a securing block 60 having an unlabeled projection extending through a portion of the pawl 52, with the securing block being secured to the spool 22 by a threaded fastener 62 as shown in FIG. 6. Preferably, the ratchet pawl 52 comprises a leaf or section of spring steel which projects at an acute angle from the spool 22 and defines an outer distal end positioned for engagement with one of the ratchet recesses 50 of the brake plate 32.

As best illustrated in FIG. 2, the locking assembly 30 securing the spool 22 over the cylindrical bearing 34 preferably comprises an end cap 64 secured to the spool over a center aperture thereof. A lock plate 66 is movably mounted within the end cap 64 and is biased in a first direction by a spring 68 interposed therebetween. The lock plate 66 is shaped so as to define an offset aperture 70 directed therethrough which receives and engages the enlarged interior head of the center axle 36. By this structure, the aperture 70 in the lock plate 66 can be aligned with the center aperture of the spool 22 so as to receive the enlarged interior head of the center axle 36 through the lock plate 66, whereby the spring 68 will bias the lock plate into an offset position to rotatably secure the spool 22 relative to the center axle 36 and over the cylindrical bearing 34.

To provide for an audible indication of the relative rotation between the component parts of the invention 10, the present invention may further include a plurality of detent projections 70 which are supported within unlabeled bores by detent springs 72. The detent projections 70 are each received within an individual one of a plurality of detent apertures 74 formed in an annular array about center apertures directed through the adjustment knob 38 and the brake plate 32, as shown in FIG. 3.

In use, the fly reel 10 according to the present invention can be easily utilized to adjustably dispense fishing line during a fly fishing procedure. The specific configuration and construction of the brake means 28 in combination with the adjustable ratchet assembly allows for adjustment of both the retarding of the motion of the spool 22 relative to the housing 12, and the direction in which such braking takes place. In other words, the invention operates to allow the spool 22 to rotate freely in a first direction, and to adjustably retard rotation of the spool in a second direction, as desired by an end user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fly reel comprising:

a main housing having a rear plate;

a center hub projecting from a center interior surface of the rear plate of the main housing;

a spool rotatably mounted about the center hub;

a brake means interposed between the spool and the main housing for effecting adjustable retarding of a rotational motion of the spool relative to the main housing to allow the spool to rotate freely in a first direction, and to adjustably retard rotation of the spool in a second direction, wherein the brake means comprises a brake plate rotatably positioned about the center hub of the main housing so as to abuttingly engage an interior surface of the rear plate thereof; a cylindrical bearing concentrically positioned and rotatably mounted about the center hub; a center axle projecting through a center of the center hub, the center axle being shaped so as to define an enlarged interior head at a first end thereof, and exterior threads extending about a second end thereof, the second end of the center axle projecting through the rear plate of the main housing; and an adjustment knob threadably engaged with the exterior threads of the center axle, with the spool being coupled to the brake plate so as to rotate therewith in at least one direction, and wherein the brake means further comprises a first friction washer interposed between an interior surface of the adjustment knob and the main housing; a tension washer formed of a resiliently deformable material interposed between the interior surface of the adjustment knob and the main housing; and a second friction washer interposed between the enlarged interior head of the center axle and an axial end of the cylindrical bearing.

2. The fly reel of claim 1, and further comprising a ratchet assembly interposed between the spool and the brake means.

3. The fly reel of claim 2, wherein the brake plate is shaped so as to define a plurality of ratchet recesses directed thereinto; and further wherein the ratchet assembly comprises a ratchet pawl mounted to the spool and positioned for engagement with one of the ratchet recesses of the brake plate during rotation of the spool relative to the main housing.

4. The fly reel of claim 3, wherein the ratchet recesses of the brake plate are each characterized as having spaced and parallel side walls engaging edges; and further wherein the spool is shaped so as to define a first pawl recess and a second pawl recess extending on opposed sides of a center aperture of the spool, with the ratchet pawl being selectively positionable and securable into either of the pawl recess so as to engage the ratchet recesses of the brake plate when the spool is rotated in a predetermined direction.

5. The fly reel of claim 4, wherein the ratchet pawl comprises a leaf of spring steel which defines an outer distal end positioned for engagement with one of the spaced and parallel side walls engaging edges of an individual one of the ratchet recesses of the brake plate.

6. The fly reel of claim 1, and further comprising a locking assembly for removably and rotatably coupling the spool relative to the main housing over the center hub.

7. The fly reel of claim 6, wherein the locking assembly comprises an end cap secured to the spool over a center aperture thereof; a lock plate movably mounted within the end cap and resiliently biased in a first direction, the lock plate being shaped so as to define an offset aperture directed therethrough which receives and engages the enlarged interior head of the center axle such that the aperture in the lock plate is adapted to be aligned with the center aperture of the spool so as to receive the enlarged interior head of the center axle through the lock plate, whereby the resiliently biased positioning of the lock plate into an offset position will rotatably secure the spool relative to the center axle and over the cylindrical bearing.

8. The fly reel of claim 1 wherein the first friction washer, the second friction washer, and the tension washer, respectively, are of different materials.

9. The fly reel of claim 8 wherein the first friction washer and the second friction washer are polytetrafluoroethylene.

10. The fly reel of claim 9 wherein the tension washer has a cross sectional shape characterized by a peripheral outer extent thereof being concave.

11. The fly reel of claim 8 wherein the tension washer is rubber or neoprene.

12. The fly reel of claim 11 wherein the tension washer has a cross sectional shape characterized by a peripheral outer extent thereof being concave.

13. The fly reel of claim 8 wherein the first friction washer and the second friction washer are polytetrafluoroethylene and the tension washer is rubber or neoprene.

14. The fly reel of claim 8 wherein the tension washer has a cross sectional shape characterized by a peripheral outer extent thereof being concave.

* * * * *